Figure 1:
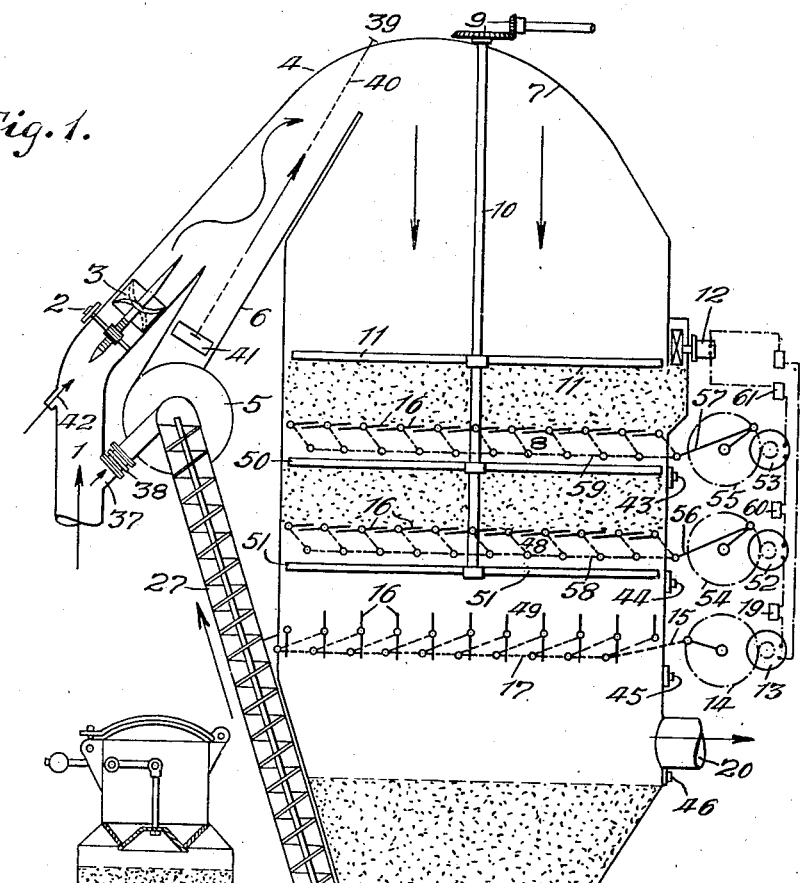

Jan. 31, 1933.　　　K. BEUTHNER　　　1,895,601
PURIFICATION OF GASES AND APPARATUS THEREFOR
Filed July 23, 1931

INVENTOR
Kurt Beuthner
BY Richards & Geier
ATTORNEY

Patented Jan. 31, 1933

1,895,601

UNITED STATES PATENT OFFICE

KURT BEUTHNER, OF KREFELD, GERMANY

PURIFICATION OF GASES AND APPARATUS THEREFOR

Application filed July 23, 1931, Serial No. 552,697, and in Germany October 27, 1930.

Distillation gases containing sulphuretted hydrogen and hydrocyanic acid may be purified by passing them through a purifying mass consisting of bog iron ore or alkalized ferric hydroxide. The apparatus for this dry method of purification usually consists of three or four successively connected shallow cast iron or concrete boxes which are closed at the top by removable wrought-iron lids and in which the purifying masses are placed on grate-like wooden supports, called gratings, usually in two, three or more layers, each 300 to 500 millimetres in thickness.

These shallow purifiers naturally require a large area, and they also require special crane installations for lifting the heavy lids, and, further, involve troublesome, tedious and unhealthy work in putting the purifying mass in and removing it. The longer the purifying mass is kept in the boxes, the more it hardens into compact and impervious lumps which are no longer absorbent, so that they work uneconomically, increase of pressure occurs and, moreover, innumerable cracks are formed in the mass through which the gas passes without being purified.

While three or four shallow purifiers may be combined one upon the other to form a purifying tower whereby a great saving of space is effected, yet even in this case similar difficulties arise as in the case of shallow purifiers in regard to the use of a stationary mass.

In order to overcome the disadvantages of using a stationary mass, various systems employing purifying towers and travelling or circulating masses have been proposed. In one case the purifying mass is, until saturated, continuously removed from the bottom of the purifying tower and again raised to the top of the tower by means of a conveying screw. It is then poured down over pivotally suspended hollow cones which are provided with a shaking device or furnished with rotatable ledges or ledge-like conveying worms, said hollow cones having perforated sheet metal walls which are steeply inclined. The gas to be purified is passed in counter-current direction into the hollow cones, and issues through holes in the walls of the cones. It then passes through the purifying mass which slides down over the walls of the cones.

Although, owing to the positive and uninterrupted progression of the mass, due either to swinging, tipping or up and down movements, or to worms provided with ledges, the mass is conveyed down into the collecting space and a partial loosening of the mass probably takes place, yet the formation of lumps is not entirely avoided since the mass is not finely comminuted (as is absolutely necessary for the purification of the gas) so as to give each particle of the mass an efficient gas absorbing power.

In another proposed construction, a current of part of the gas to be purified or gas already purified, is forced out through a nozzle and is used for projecting the purifying mass in a fine state of division in counter current into the main current of gas. The auxiliary gas current mixes with the main gas current and they are both passed through a filter charged with fresh purifying mass so as to remove the last traces of impurities as well as any dust carried with the gas.

In the above construction, the purifying mass has to be reduced to dust by a current of gas, for which purpose a special blower must be employed to give the gas a speed which will, on the one hand, cause the fresh purifying mass supplied to be fed forward with an ejector action, and will, on the other hand, produce a pressure sufficient to press the gas together with the mass through a nozzle and force them upwardly. Whether or not, however, the gas is really capable, as is necessary, of sucking in and carrying along with it a mass which must have a substantial moisture content, in sufficient and uniform quantity, is entirely dependent upon whether the mass is sufficiently finely comminuted and loosened before the suction action. Otherwise failure of the whole plant may readily occur.

The object of this invention is to obviate the above disadvantages of purifying towers as hitherto known, and, moreover, produces certain other advantages which will hereinafter appear.

According to the invention, the purifying mass is circulated in a cylindrical or other shaped dry-purifying tower, until it is saturated, being removed from the purifying tower at the bottom, again conveyed upwards and passed to a combined grinding and centrifuging mill, hereinafter termed a "mass mill", which comminutes and breaks up the mass into a dust, so as to give each particle of the mass an extremely efficient absorptive power. The mill will then project the dust through an opening in the gas supply pipe into the top part of the purifying tower, which is provided lower down with gratings, which can be opened up.

Fitted in the gas supply pipe, in advance of the position at which the mass supply tube opens into the purifier, is a removable spiral member, which may be in the form of a spiral or helical metallic body and which fits the cross-section of the tube. This spiral member sets the current of gas to be purified into a whirling motion under normal working pressure, and is adapted to be adjusted from the outside, so that the current of gas which is projected by the mill, through the mass-supply tube into the purifying tower, takes up with it the powdery purifying mass at the most favourable position in the mixing tube and owing to the whirling motion is intimately mixed with the mass before it enters the purifying tower.

The continual filling of the bottom supply receptacle of the purifying tower is effected by discharging the purifying mass located on the bottom grating by opening it up, and refilling this grating by the opening up of the grating above it, the opening up of all the grating supports for the purifying mass being positively controlled in an automatic manner by the switching in of motors and transmission gears by an electrical indicator of the level of the purifying mass in the top part of the purifying tower. Checking of the level to which the mass rises on each separate grating support as well as of the quantity of the mass in the bottom supply receptacle is possible at any time by means of special indicators and inspection apertures.

In order to obtain a uniform depth of the mass upon the individual gratings, there is provided a rotary device which has levelling arms arranged above each grating and is driven from the outside. The rotation of this device continually levels the mass quite uniformly on the gratings by means of its levelling arms.

In order to give the purifying mass a sufficient velocity of projection and to neutralize the suction action of the vanes of the mass mill, the quantity of gas necessary for this purpose is regulated and supplied to the inlet side of the mill from the main gas pipe through a branch pipe.

In order that the invention may be clearly understood and readily carried into practice, I have appended hereto two sheets of drawings, illustrating the same, wherein:—

Figure 2:
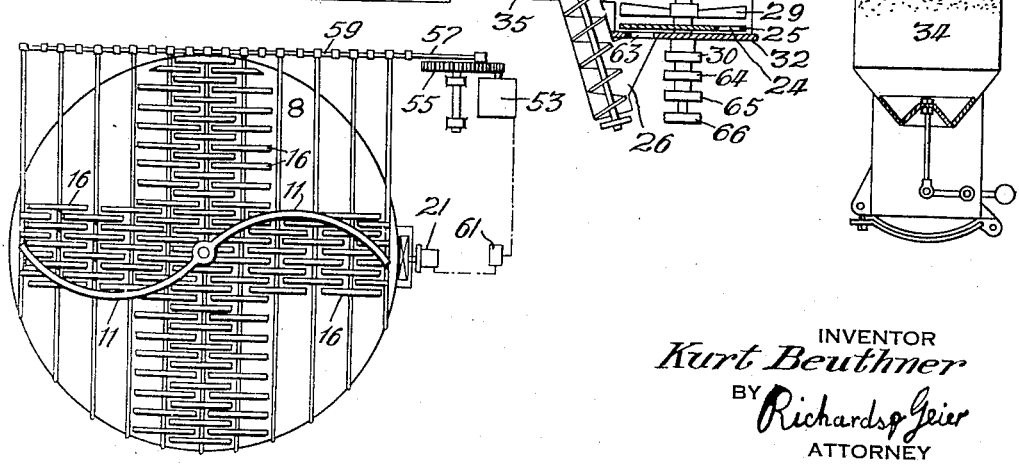

Figure 1 is a vertical section through a purifying tower according to the invention, and Figure 2 is a cross-section through the upper part of the purifying tower, the grating supports being only partially shown.

The impure distillation gas enters through the pipe 1 at the normal working pressure and is set in rotary motion by a spiral 3 which is adjustably movable in the pipe 1 by the external operating member 2. The gas then reaches the mixing tube 4 where it meets the purifying mass, which has been broken up and reduced to dust and is projected upwardly by the grinding and centrifuging mill 5 through the pipe 6.

The gas mixes intimately with the purifying mass owing to the whirling motion caused by the spiral 3. The gas and the mass are then deflected downwardly by the domed deflecting plate 7, with the result that, on the one hand, the gas current is deflected downwardly and, on the other hand, the powdery purifying mass falls slowly downwards in the form of a dense cloud, on account of the expansion of the gas which takes place, in the large cylindrical space. Thus the gas and dust become still further mixed into intimate contact with each other, and part of the sulphuretted hydrogen and hydrocyanic acid becomes separated from the gas and fixed in the purifying mass.

The mass falls down in a loose form on the upper rotatable grating support 8, and is uniformly levelled by the rotating spreading arms 11 which are driven from outside the purifying tower by toothed wheels 9 and axle 10. The dust collects up to a definite level which is indicated electrically—e. g., by the lighting of a red lamp—by the electric level indicator 12. The indicator 12 does not operate until all the grating supports are filled with the mass. It then sets the purifying tower into operation by switching in the electric motor 13.

The electric motor 13 operates, through intermediate gearing 14 and connecting rod 15, the rods 17 which are located outside the purifying tower and are connected with the axles of the individual rotatable grating members 16 so that the rotatable grating members are rotated through 90 degrees, whereby the bottom grating support 49 is opened, as shown, and the mass supported thereby drops into the supply receptacle 18. After discharging, the rotatable grating members 16 of the grating support 49 are again automatically returned, by means of the same apparatus by which they were made to rotate, horizontally into the filling position (as at 8 and 48), to be thereupon again filled from the grating support 48 above it. This empties itself in a similar manner by the automatic switching in of the electric motor 52 by the automatic switching device 19 of the motor 13. The contents of the grating 49 are continually being levelled by the spreading arms 51. The above operations are repeated up to the top supporting grating 8, which is operated by the electric motor 53 and the switching device 60 of the motor 52. The succession of operations is then positively and automatically begun again.

Thus a succession of grating supports are continually charged with the mass, so that they serve as main purifiers and re-purifiers for removing the last traces of sulphuretted hydrogen and hydrocyanic acid and also, at the same time, act as dust traps.

Any desired number of grating supports can be provided above one another according to requirements, or according to the quantity of gas passing through.

The object of the rotary spreading arms 11, 50 and 51, driven by the common axle 10, is to avoid the irregular formation of heaps on the individual grating supports and by thorough and uniform levelling to render impossible the passage of any unpurified gas.

Owing to the fact that the distillation gas to be purified flows downwards from the top through the purifying mass, the hardening that would otherwise readily occur on the grating supports and the consequent difficulty of rotating the individual gratings 16 does not arise. Furthermore, owing to the fact that it is continually in motion and is repeatedly returned to the mill for the purpose of being ground fine, the purifying mass cannot become hard of itself and form lumps, but remains loose and in the form of dust. Also owing to the large effective surface occasioned by the fineness, the mass is more efficient in its absorptive power and can consequently be piled higher on the gratings 8, 48 and 49 than in other dry-purifying devices. Consequently, the gas can flow through the deep layer of dust lying on the gratings readily and almost without loss of pressure. The speed of working can also be increased, so that the purifier itself may be of small dimensions and thus the cost of the plant reduced.

After the gas has flowed through the purifying mass on the lowest grating support, it leaves the dry-purifying tower at 20 in a purified condition. The grating supports 8, 48 and 49 themselves consist of a number of known rotatable finger-like individual grating members 16 of any desired construction which automatically clean themselves by their rotation.

The purifying mass, after dropping through the lowest grating support 49, drops into the bottom funnel-shaped supply receptacle 18, and passes, for the purpose of always delivery equal quantities of mass, through the delivery disc 21 which has a circular opening 22, into the intermediate container 23 and is then supplied in uniform quantities through the circular opening 24 of the lower delivery disc 25 and through the chute 26 to the screw conveyor 27 and, by the latter, into the mass mill 5, which again finely comminutes the mass and projects it upwardly.

In order that the mass may always move down properly in the supply receptacle 18, a stirrer 28 is located above the upper delivery disc 21 and another stirrer 29 in the container 23 serves the same purpose. The delivery discs 21 and 25 and the stirrers 28 and 29 are driven by the gear wheels 30, 64, 65 and 66.

The openings of the two delivery discs 21, 25 are displaced in relation to each other, so as to form a closure for the gas passing between the gas inlet and the gas exit 20, the openings 62 and 63 of the closing plates 31 and 32 of the intermediate container, corresponding to the openings 22 and 24 of the delivery discs, being alternately opened and closed.

After saturation of the purifying mass, it is carried away from the receptacle 18 by the conveying worm 33, (after stoppage of the upper delivery disc 21), and it is conveyed to the emptying receptacle 34 from which it is discharged into the open.

At the same time, the supply worm 35 conveys fresh mass from the charging container 36 into the intermediate container 23, from which it passes into the mass mill 5 through the opening 24 of the lower delivery disc 25 and the chute 26 and through the conveyor 27, so that no interruption of the purifying process takes place.

After the whole of the saturated mass has been taken out and all the grating supports have been automatically refilled with fresh mass, the upper delivery disc 21 is again set in motion, after stoppage of the conveying worm 33, and the sequence of operations begins afresh.

In order to impart the desired velocity of projection to the comminuted mass and also to supply the inlet side of the mill 5 with the quantity of gas that is necessary to equalize the suction action of the vanes, a small by-pass pipe 37 with a regulating device 38 is branched off from the main gas pipe 1 to the mass mill 5. The unpurified distillation gas here branched off mixes intimately in the mass mill with the comminuted mass and, mixed with the latter, again meets the main supply of gas in the mixing tube 4.

In order to remove the purifying mass that is in course of time deposited by the centrifugal action in the mass tube 6 and the mixing tube 4, there is located therein a cylindrical tube cleaner 41 which can be moved up and down and is operated from the outside at 39 by a rod 40.

For the purpose, as is usual, of regenerating and moistening the mass during working, air and steam are supplied to the main gas pipe 1 at 42 through a small inlet pipe.

Inspection holes 43 to 47 are provided for use in observing the operation and taking samples of the purifying mass.

What I claim is:—

1. A purifying tower for removing sulphuretted hydrogen and hydrocyanic acid from gases by the circulation from top to bottom until saturated of a purifying mass, including a grinding and centrifuging mill adapted to break up and comminute the mass into dust and project the dust into the upper part of the tower, superposed supporting gratings in the tower for layers of the dust, which supporting gratings are adapted to be opened up so as to discharge their contents downwardly, a device adapted to indicate the dust level in the upper part of the tower, and electrical switch gear and operating means adapted automatically to open up the supporting gratings under the control of the indicating device.

2. A purifying tower for gases in combination with means adapted to supply gas to be purified to the upper part of the tower, means adapted simultaneously to supply a purifying material in dust form to the upper part of the tower, a plurality of transverse grids in the tower, means adapted intermittently to open said grids and discharge the dust deposited thereon in a downward direction, means adapted for removing the purifying material discharged into the lower part of the tower by the lowermost grid, a material comminuting mill, means adapted to transfer partially saturated material from the lower part of the tower to the comminuting mill, means adapted for conveying the comminuted material from the mill to the top of the tower again, means adapted for supplying fresh purifying material at will to the comminuting mill in lieu of material from the purifying tower, and means adapted for removing saturated purifying material at will from the lower part of the tower.

3. The combination as set forth in claim 2, including a mixing tube communicating with the top of the tower and having branch pipes supplied respectively with gas to be purified and with the pulverized purifying material.

4. The combination as set forth in claim 2, including a mixing tube communicating with the top of the tower and having branch pipes supplied respectively with gas to be purified and with the pulverized purifying material, and a spiral device in the gas supply branch pipe for imparting a whirling motion to the gas.

5. The combination as set forth in claim 2, including a mixing tube communicating with the top of the tower and having branch pipes supplied respectively with gas to be purified and with the pulverized purifying material, and a device in the supply pipe for the pulverized purifying material adapted to project said material into the mixing tube.

6. The combination as set forth in claim 2, wherein the comminuting mill is located at a level above the lower part of the tower and purifying material is transferred thereto from the bottom of the tower by a screw elevator and conveyor.

7. The combination as set forth in claim 2, including a receptacle for purifying material at the bottom of the tower, and a screw conveyor adapted for conveying fresh purifying material to said receptacle.

8. The combination as set forth in claim 2, including a screw conveyor and elevator adapted for transferring purifying material from the bottom of the tower to the comminuting mill, a receptacle for purifying material at the bottom of the tower, a screw conveyor adapted for conveying fresh purifying material to said receptacle, and a screw conveyor adapted for removing saturated purifying material from the bottom of the tower.

9. The combination as set forth in claim 2, including a mixing tube communicating with the top of the tower and having branch pipes supplied respectively with gas to be purified and with the pulverized purifying material, a spiral device in the gas supply branch pipe for imparting a whirling motion to the gas, and a device in the supply pipe for the pulverized purifying material adapted to project said material upwardly into the mixing tube.

10. A process for purifying gases consisting in supplying the main part of the gases under normal pressure into the upper part of a purifying tower, employing a part of the gases under pressure to convey purifying material in dust form into the upper part of the tower, allowing the dust to settle in layer form, passing the gases through the settled dust, removing the partially saturated dust, passing it again through the tower with fresh gases until saturated, and finally removing the dust from the tower when saturated.

11. A process for purifying gases consisting in supplying the main part of the gases under normal pressure with a whirling motion into a mixing tube communicating with the upper part of a purifying tower, employing a part of the gases under pressure to convey purifying material in dust form also into said mixing tube, allowing the dust to settle in layer form, passing the gases through the settled dust, removing the partially saturated dust, passing it again through the tower with fresh gases until saturated, and finally removing the dust from the tower when saturated.

In testimony whereof I have affixed my signature.

KURT BEUTHNER.